United States Patent
Guo et al.

(10) Patent No.: US 12,249,900 B2
(45) Date of Patent: Mar. 11, 2025

(54) CONTROL CIRCUIT, CONTROL CHIP AND POWER SUPPLY DEVICE

(71) Applicant: SHANGHAI BRIGHT POWER SEMICONDUCTOR CO., LTD., Shanghai (CN)

(72) Inventors: Yanmei Guo, Shanghai (CN); Zhen Zhu, Shanghai (CN); Yuehui Li, Shanghai (CN); Yihui Chen, Shanghai (CN); Xiaoru Gao, Shanghai (CN); Haifeng Miao, Shanghai (CN); Rulong Jiang, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 221 days.

(21) Appl. No.: 17/892,314

(22) Filed: Aug. 22, 2022

(65) Prior Publication Data
US 2023/0063861 A1    Mar. 2, 2023

(30) Foreign Application Priority Data
Aug. 27, 2021 (CN) .......................... 202110997817.0

(51) Int. Cl.
*H02M 1/00* (2007.01)
*H02M 1/32* (2007.01)

(52) U.S. Cl.
CPC ........... *H02M 1/0025* (2021.05); *H02M 1/32* (2013.01)

(58) Field of Classification Search
CPC ................. H02M 1/0025; H02M 1/32; H02M 3/156–1588; G05F 1/575
See application file for complete search history.

(56) References Cited

U.S. PATENT DOCUMENTS

| 5,986,434 A | * | 11/1999 | Roy | ................. | H02J 7/007194 |
| | | | | | 320/128 |
| 2012/0187930 A1 | * | 7/2012 | Williams | .............. | G05F 1/5735 |
| | | | | | 323/273 |

(Continued)

FOREIGN PATENT DOCUMENTS

| CN | 203574435 U | 4/2014 |
| CN | 110311560 A | 10/2019 |

(Continued)

*Primary Examiner* — Fred E Finch, III
(74) *Attorney, Agent, or Firm* — MUNCY, GEISSLER, OLDS & LOWE, P.C.

(57) ABSTRACT

A control circuit, a control chip and a power supply device are disclosed by the present invention. The control circuits are used for control of a constant-voltage closed-loop which causes a voltage of a voltage feedback signal obtained from an output voltage to approach a voltage of a reference voltage signal obtained from a base voltage and thereby achieves a constant-voltage output. In addition, when a sampled current obtained from an output current is higher than a predetermined current, or when output power is higher than a predetermined power, the control circuit increases the voltage feedback signal or decreases the reference voltage signal, causing the constant-voltage closed loop to decrease the output voltage and the output current and thereby achieving a limited output current and limited output power.

13 Claims, 7 Drawing Sheets

(56) References Cited

U.S. PATENT DOCUMENTS

| | | | | |
|---|---|---|---|---|
| 2012/0274290 | A1* | 11/2012 | Ye | H02M 3/156 |
| | | | | 323/234 |
| 2013/0120891 | A1* | 5/2013 | Truong | H02M 1/32 |
| | | | | 361/93.9 |
| 2016/0329807 | A1* | 11/2016 | Daly | H02M 1/32 |
| 2018/0145593 | A1* | 5/2018 | Xi | H02M 3/156 |
| 2019/0086943 | A1 | 3/2019 | Namekawa et al. | |
| 2021/0067037 | A1* | 3/2021 | Namekawa | H02M 3/157 |

FOREIGN PATENT DOCUMENTS

| | | |
|---|---|---|
| CN | 112448578 A | 3/2021 |
| CN | 112558679 A | 3/2021 |

* cited by examiner

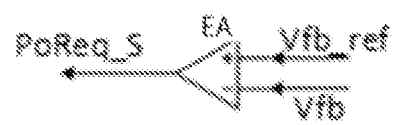
Fig.7
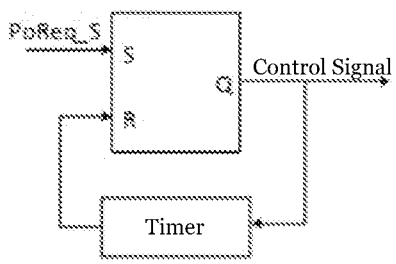
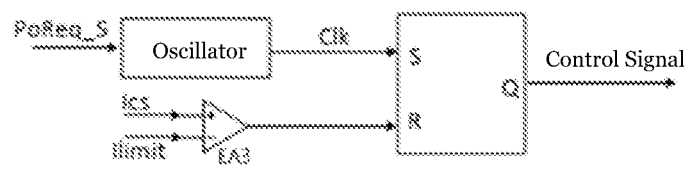
Fig.8A                                    Fig.8B

CONTROL CIRCUIT, CONTROL CHIP AND POWER SUPPLY DEVICE

CROSS-REFERENCE TO RELATED APPLICATION

This application claims the priority of Chinese patent application number 202110997817.0, filed on Aug. 27, 2021, the entire contents of which are incorporated herein by reference.

TECHNICAL FIELD

The present invention relates to the field of power supply technology and, in particular, to a control circuit, a control chip and a power supply device.

BACKGROUND

In current power supply applications, it is often necessary to control output currents and output voltages of power supply devices in order to meet the requirements of reliability and functional diversity. For instance, in order to address a constant-current need that requires an output current to be maintained substantially unchanged, a control circuit for a power supply device may sample the device's output current, compare it with a reference current and produce a feedback signal to control an output current of a main power circuit, thus causing the output current to approach the reference current, thereby achieving the constant-current purpose. In order to address a constant-voltage need that requires an output voltage to be maintained substantially unchanged, a control circuit for a power supply device may sample the device's output voltage, compare it with a reference voltage and produce a feedback signal to control an output voltage of a main power circuit, thus causing the output voltage to approach the reference voltage, thereby achieving the constant-voltage purpose. In some applications, a current loop capable of satisfying a constant-current need and a voltage loop capable of satisfying a constant-voltage need may be incorporated in the same control circuit, and a selection circuit may select one of them for operation. That is, either the output voltage is selected to participate in the closed loop to provide a constant-voltage output, or the output current is selected to participate in the closed loop to provide a constant-current output.

However, the above approach that utilizes a selection circuit to select a constant-voltage control or a constant-current control has only a single function and is not able to limit the output current or the output power at the same time of a constant-voltage modulation. Therefore, the requirements of reliability and functional diversity cannot be met.

SUMMARY OF THE INVENTION

The present invention provides a control circuit which is able to limit the output current and the output power at the same time of a constant-voltage modulation. The present invention also provides a control chip and a power supply device, each including the control circuit.

In one aspect, the present invention provides a control circuit for controlling a constant-voltage closed loop, wherein the constant-voltage closed loop is configured to cause a voltage of a voltage feedback signal obtained from an output voltage to approach a voltage of a reference voltage signal obtained from a base voltage to achieve a constant-voltage output. Additionally, when a sampled current obtained from an output current is higher than a predetermined current, or when output power is higher than a predetermined power, the control circuit increases the voltage feedback signal or decreases the reference voltage signal, causing the constant-voltage closed loop to decrease the output voltage and the output current and thereby achieving a limited output current and a limited output power.

Optionally, when the sampled current is not higher than the predetermined current and the output power is not higher than the predetermined power, the voltage feedback signal may be proportional to an output voltage characterizing value that characterizes an output voltage feedback, and wherein the reference voltage signal may be proportional to the base voltage.

Optionally, the control circuit may compensate for the voltage feedback signal or the reference voltage signal using an amplified error signal characterizing that the sampled current is higher than a reference current, thereby increasing the voltage feedback signal or decreasing the reference voltage signal, wherein the reference current is generated based on the predetermined power, the predetermined current and the output voltage characterizing value.

Optionally, the reference current may be a lower one of i) a quotient of the predetermined power and the output voltage characterizing value, and ii) the predetermined current.

Optionally, the control circuit may compensate for the voltage feedback signal or the reference voltage signal using a first amplified error signal characterizing that the sampled current is higher than the reference current, thereby increasing the voltage feedback signal or decreasing the reference voltage signal, and simultaneously compensate for the voltage feedback signal or the reference voltage signal using a second amplified error signal characterizing that the output power is higher than the predetermined power, thereby increasing the voltage feedback signal or decreasing the reference voltage signal.

In one aspect, the present invention provides a control circuit comprising an error amplification module, an addition and subtraction module, a comparison module and a control module. The error amplification module is configured to: compare a sampled current obtained from an output current with a predetermined current; compare an output power characterizing value that characterizes an output power with a predetermined power; and output an amplified error signal indicating a current-limiting or power-limiting compensation information. The addition and subtraction module is configured to receive a base voltage, an output voltage characterizing value that characterizes an output voltage feedback and the amplified error signal, wherein a reference voltage signal is generated based on the base voltage, a voltage feedback signal is generated based on the output voltage characterizing value, and wherein when the sampled current is higher than the predetermined current, or when the output power characterizing value is higher than the predetermined power, the addition and subtraction module is configured to increase the voltage feedback signal or to decrease the reference voltage signal is decreased. The comparison module is configured to compare the voltage feedback signal with the reference voltage signal and to generate an output feedback signal. The control module is configured to receive the output feedback signal and to generate a control signal for controlling the output voltage so as to cause a voltage of the voltage feedback signal to approach a voltage of the reference voltage signal.

Optionally, the output power characterizing value may be a product of the output voltage characterizing value and the sampled current.

Optionally, the control circuit may further comprise a reference current generation module coupled to the error amplification module. The reference current generation module may be configured to generate a reference current based on the predetermined power, the output voltage characterizing value and the predetermined current, wherein the reference current is a lower one of i) a quotient of the predetermined power and the output voltage characterizing value, and ii) the predetermined current.

Optionally, the reference current generation module may comprise a divider and a selector. The divider may receive the predetermined power and the output voltage characterizing value and output the quotient of the predetermined power and the output voltage characterizing value. The selector may have a first input terminal at which the predetermined current is received. The selector may have a second input terminal coupled to an output terminal of the divider. The selector may select and output a lower one of i) a signal input to the first input terminal, and ii) a signal input to the second input terminal as the reference current.

Optionally, the error amplification module may comprise an operational transconductance amplifier configured to receive the reference current and the sampled current and to output the amplified error signal, wherein the addition and subtraction module comprises two resistors connected in series between the base voltage and a ground, or between the output voltage characterizing value and the ground, and wherein the amplified error signal characterizing that the sampled current is higher than the reference current is transmitted via a diode to a series connection node of the two resistors, thereby compensating for a voltage of a corresponding one of the reference voltage signal and the voltage feedback signal output from the series connection node, with a voltage of the other one of the reference voltage signal and the voltage feedback signal remaining unchanged.

Optionally, the error amplification module may comprise an operational error amplifier configured to receive the reference current and the sampled current and to output the amplified error signal, and wherein the addition and subtraction module comprises a first resistor which is coupled at a first end to the reference voltage or the output voltage characterizing value and is connected at a second end in series with a second resistor, and wherein the amplified error signal characterizing that the sampled current is higher than the reference current is transmitted via the second resistor to a series connection node of the first and second resistors, thereby compensating for a voltage of a corresponding one of the reference voltage signal and the voltage feedback signal output from the series connection node, with a voltage of the other one of the reference voltage signal and the voltage feedback signal remaining unchanged.

Optionally, the amplified error signal may comprise a first amplified error signal and a second amplified error signal, wherein the error amplification module comprises a first error amplification unit and a second error amplification unit, the first error amplification unit configured to compare the sampled current with the predetermined current and to output the first amplified error signal, the second error amplification unit configured to compare the output power characterizing value with the predetermined power and to output the second amplified error signal.

Optionally, the first error amplification unit may comprise a first operational transconductance amplifier that outputs the first amplified error signal, with the second error amplification unit comprising a second operational transconductance amplifier that outputs the second amplified error signal, wherein the addition and subtraction module comprises two resistors connected in series between the base voltage and a ground, or between the output voltage characterizing value and the ground, wherein the first amplified error signal characterizing that the sampled current is higher than the predetermined current is transmitted via a first diode to a series connection node of the two resistors, and wherein the second amplified error signal characterizing that the output power characterizing value is higher than the predetermined power is transmitted via a second diode to the series connection node of the two resistors, thereby compensating for a voltage of a corresponding one of the reference voltage signal and the voltage feedback signal output from the series connection node, with a voltage of the other one of the reference voltage signal and the voltage feedback signal remaining unchanged.

Optionally, the first error amplification unit may comprise a first operational error amplifier that outputs the first amplified error signal, with the second error amplification unit comprising a second operational error amplifier that outputs the second amplified error signal, wherein the addition and subtraction module comprises a first resistor which is coupled at a first end to the base voltage or the output voltage characterizing value and is connected at a second end with a second resistor, the first amplified error signal characterizing that the sampled current is higher than the predetermined current is transmitted via the second resistor to a series connection node of the first and second resistors, and the second amplified error signal characterizing that the output power characterizing value is higher than the predetermined power is transmitted via the second resistor to the series connection node of the first and second resistors, thereby compensating for a voltage of a corresponding one of the reference voltage signal and the voltage feedback signal output from the series connection node, with a voltage of the other one of the reference voltage signal and the voltage feedback signal remaining unchanged.

Optionally, the second error amplification unit may further comprise a multiplier which receives the output voltage characterizing value and the sampled current and outputs the product of the output voltage characterizing value and the sampled current as the output power characterizing value.

In one aspect, the present invention provides a control chip to control output voltage, output current and output power of a switched-mode power supply. The switched-mode power supply comprises a power switch, and the control chip incorporates the control circuit as defined above.

In one aspect, the present invention provides a power supply device comprising the control circuit as defined above.

The control circuits provided in the present invention both include a constant-voltage closed-loop capable of causing a feedback voltage obtained based on an output voltage feedback to approach a reference voltage obtained based on a base voltage and thereby achieving a constant-voltage output. Moreover, when the sampled current obtained based on the output current feedback is higher than a predetermined current, or when an output power is higher than a predetermined power, the control circuits increase the voltage feedback signal or decrease the reference voltage signal, causing the constant-voltage closed loop to decrease the output voltage and the output current and thereby achieving a limited output current and a limited output power. Constant-voltage modulation, current-limiting modulation and power-limiting modulation can be provided as needed. Therefore, they are functionally comprehensive and flexible. Moreover, the problem of control signal instability in a ripple-based control mode that relies on switching frequency ripple in the output current, which may arise in the case of an output current parameter being directly used for current-limiting modulation, can be avoided. Thus, improved control stability and control accuracy can be achieved.

As the control chip and power supply device of the present invention both include either of the control circuits, they have the similar advantages as the control circuits.

BRIEF DESCRIPTION OF THE DRAWINGS

FIG. 7 is a schematic circuit diagram of a comparison module in the control circuit according to an embodiment of the present invention.

FIG. 8A is a schematic circuit diagram of a control module in the control circuit according to an embodiment of the present invention.

FIG. 8B is a schematic circuit diagram of the control module in the control circuit according to an embodiment of the present invention.

DESCRIPTION OF REFERENCE NUMERALS IN DRAWINGS

100—Control Circuit; 10—Error Amplification Module; 20—Addition And Subtraction Module; 30—Comparison Module; 40—Control Module; 50—Reference Current Generation Module; 501—Divider; 502—Selector; 101—First Error Amplification Unit; 102—Second Error Amplification Unit.

DETAILED DESCRIPTION

The control circuit, control chip and power supply device proposed in the present invention will be described in greater detail below with reference to the accompanying drawings and specific embodiments. From the following description, advantages and features of the present invention will become more apparent. Note that the drawings are provided in a very simplified form not necessarily drawn to exact scale for the only purpose of helping to explain the disclosed examples in a more convenient and clearer way.

Figure 1:
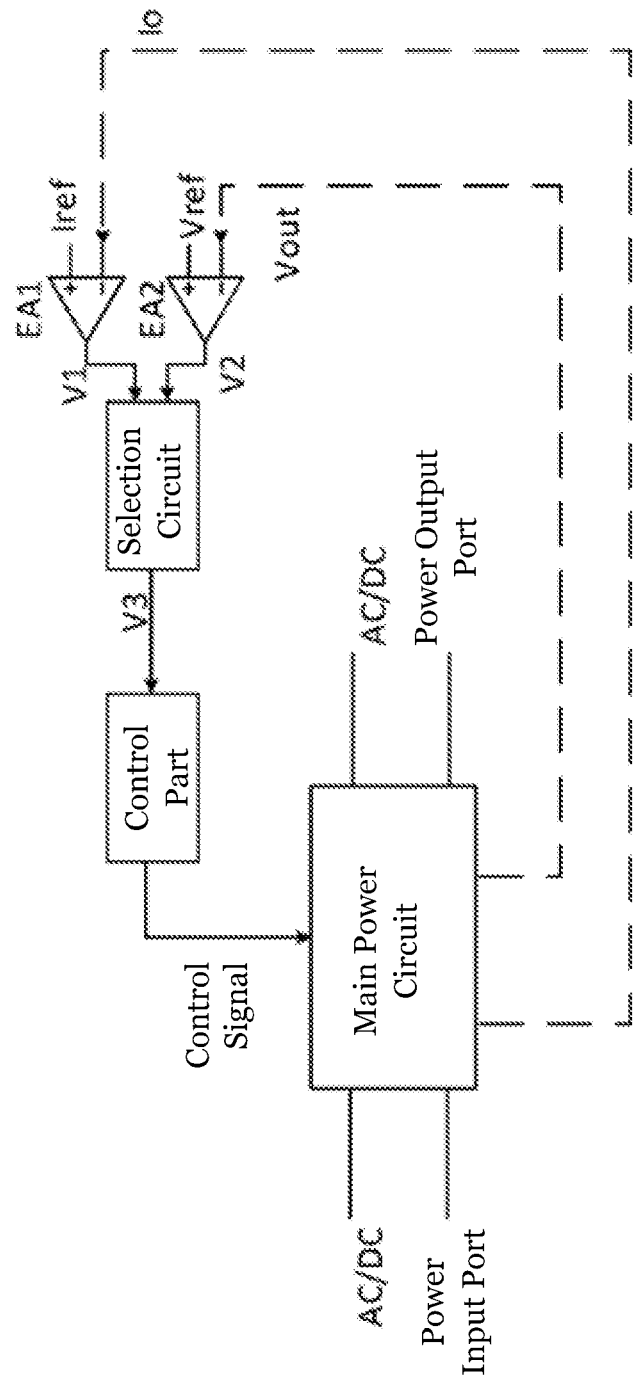
FIG. 1 is a schematic diagram showing a power output circuit incorporating a voltage loop and a current loop, one of which is selected for use by a selection circuit.

FIG. 1 is a schematic diagram showing a power output circuit incorporating a voltage loop and a current loop, one of which is selected for use by a selection circuit. Referring to FIG. 1, in a power output circuit (e.g., a switched-mode power supply), an alternating current (AC) signal or a direct current (DC) signal is fed into a main power circuit of the switched-mode power supply via a power input port, and an AC signal or a DC signal is output from a power output port. A sampling circuit (not shown) can sample an output voltage and an output current from the power output port and obtain a corresponding feedback signal. For example, a fraction of the output voltage is obtained as a feedback voltage characterizing value Vout, and the output current is sampled as a sampled current Io. A voltage signal of the sampled current Io and a voltage signal of a reference current Io_ref are received respectively at two input terminals of an operational amplifier EA1, and a current feedback signal V1 is responsively generated at an output terminal of the operational amplifier EA1. The feedback voltage characterizing value Vout and a base voltage Vref are respectively input to two input terminals of an operational amplifier EA2, and a voltage feedback signal V2 is responsively generated at an output terminal of the operational amplifier EA2. A control part may produce a control signal for controlling the output voltage and the output current based on the current feedback signal V1, causing the sampled current Io approach the reference current Io_ref (Io=Iref). That is, constant-current closed-loop feedback is achieved. The control part may also produce a control signal for controlling the output voltage based on the voltage feedback signal V2, causing the feedback voltage characterizing value Vout to approach the reference voltage (Vout=Vref). That is, constant-voltage closed-loop feedback is achieved. In this power output circuit, the selection circuit is used to select one of the current feedback signal V1 and the voltage feedback signal V2, which is then input to the control part. In other words, the selection circuit is used to determine whether to choose parameters of the sampled current Io and the reference current Io_ref for closed-loop control for a constant-current function, or to choose parameters of the output voltage Vout and the base voltage Vref for closed-loop control for a constant-voltage function. At the level of device implementation, the selection circuit typically utilizes two switches to select one of the two.

The power output circuit shown in FIG. 1 is associated with the problems detailed below. First, in some power supply applications (e.g., electric chargers), it is required both to output a constant voltage and to limit an output current and an output power within predetermined maximum values. However, the power output circuit of FIG. 1 can only output a constant voltage or a constant current. This single function cannot satisfy the requirements of reliability and functional diversity. Second, when the control part employs a ripple-based control mode (e.g., a constant on-time (COT) control mode) to produce a control signal for controlling the output voltage, as the output current contains little switching frequency ripple, a constant-current closed loop directly formed on the basis of an output current parameter will suffer from an instable control signal. In order to address this stability problem, it is necessary to add a module with ripple injection capabilities. However, if appropriate ripple injection is not attained, the accuracy of the output constant current will be affected. The present invention is proposed to overcome these problems.

Figure 2:
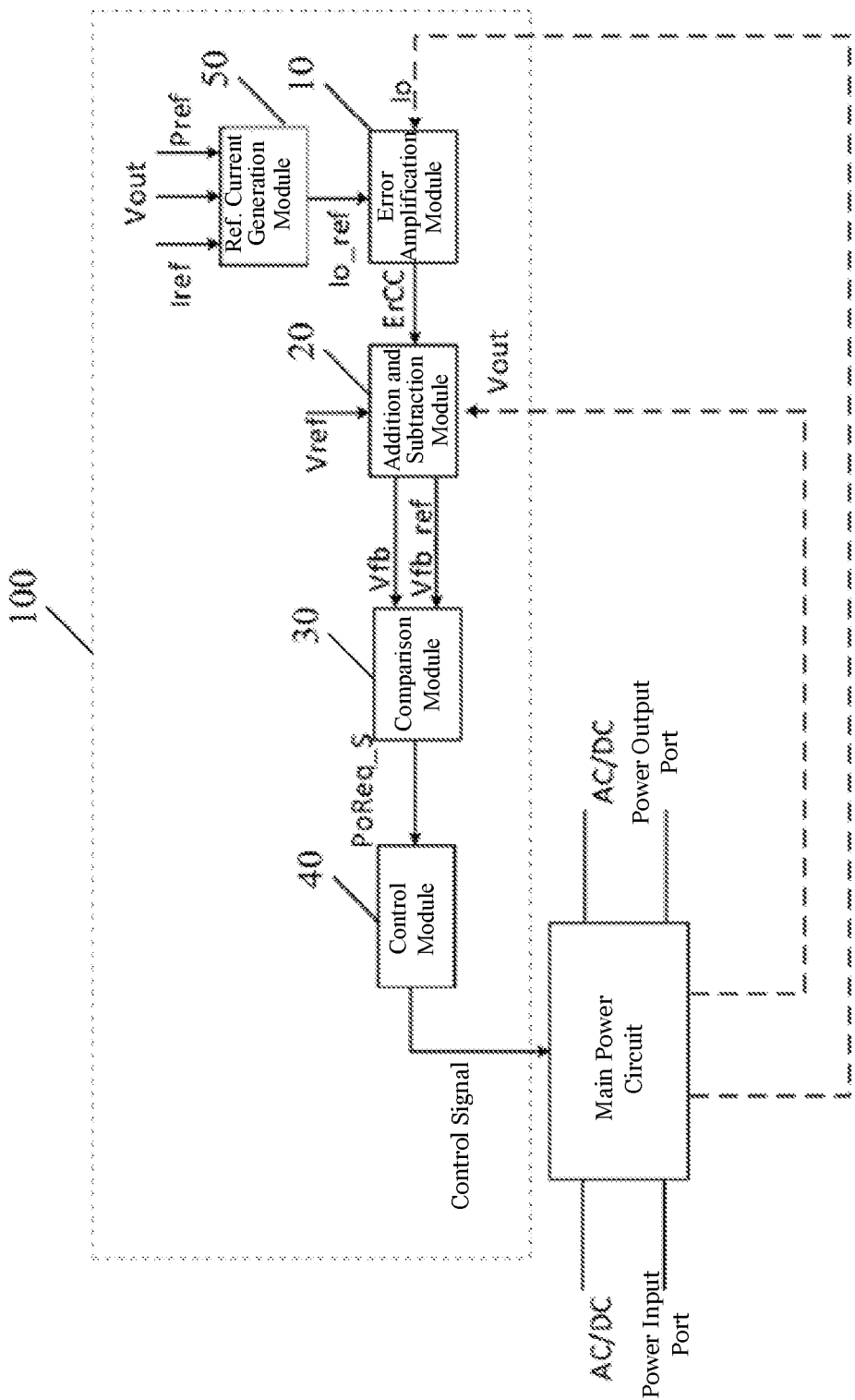
FIG. 2 is a schematic diagram showing the structure of a control circuit according to an embodiment of the present invention.
Figure 5:
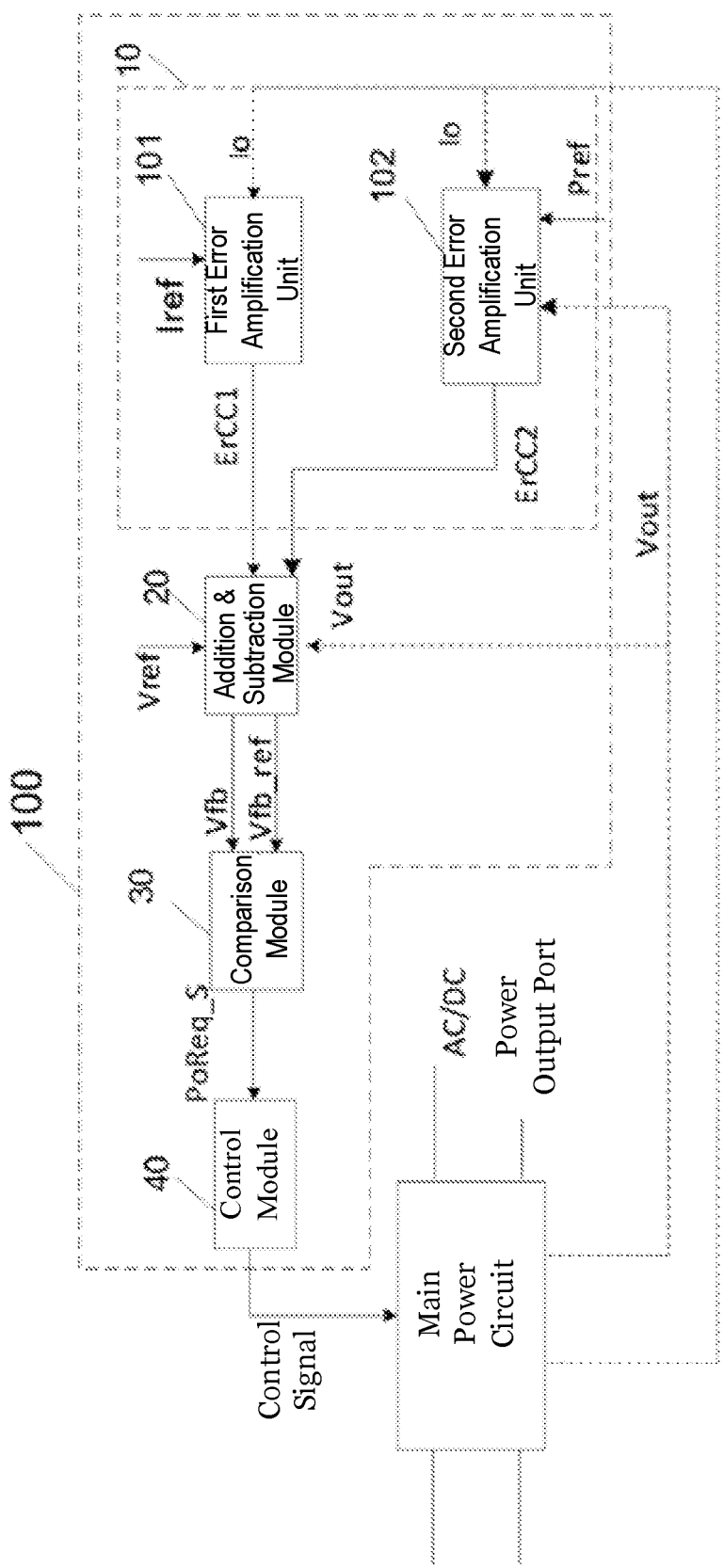
FIG. 5 is a schematic diagram showing the structure of the control circuit according to another embodiment of the present invention.

In the following embodiments of the present invention, a control circuit is described, which can be used to control output of a power output circuit. The power output circuit may be any of various circuits capable of providing loads with voltages and currents, such as buck converters, boost converters and buck-boost converters. The power output circuit is, for example, a circuit of a switched-mode power supply. The power output circuit which is controlled by the control circuit according to these embodiments, for examples, includes a main power circuit as shown in FIGS. 2 and 5. Here, the "main power circuit" refers to a part of the power output circuit that is configured to receive a power input and produce a power output. In constant-voltage loop control, the main power circuit forms a part of the constant-voltage loop. The main power circuit, for example, has a power input port for receiving a voltage signal (AC/DC) and a power output port for outputting a voltage signal (AC/DC).

In the following embodiments, a feedback of an output voltage is taken as an output voltage characterizing value Vout. The output voltage characterizing value Vout is, for example, obtained by dividing the output voltage from the power output port of the power output circuit. A feedback of an output current is taken as a sampled current Io. The sampled current Io is, for example, obtained by sampling the output current from the power output port of the power output circuit. Output power is characterized by an output power characterizing value. The output power characterizing value is, for example, the product of the output voltage characterizing value Vout and the sampled current Io.

Apart from the constant-voltage modulation (corresponding to a constant-voltage mode intended to produce a constant output voltage), the control circuit according to embodiments of the present invention can also perform, as required, a current-limiting modulation (corresponding to a current-limiting mode intended to produce a limited output current) and a power-limiting modulation (corresponding to a power-limiting mode intended for a limited output power). The constant-voltage modulation is performed to cause a voltage of a voltage feedback signal Vfb to approach a voltage of a reference voltage signal Vfb_ref that serves as a base reference. The voltage feedback signal Vfb is obtained based on the output voltage characterizing value Vout, and the reference voltage signal Vfb_ref is obtained based on a base voltage Vref. The current-limiting modulation is performed to cause the sampled current Io not exceed a predetermined current Iref. The power-limiting modulation is performed to cause the output power (or the output power characterizing value) not exceed a predetermined power Pref.

FIGS. 2 and 5 are structural schematics of the control circuit according to embodiments of the present invention. Referring to FIGS. 2 and 5, in these embodiments, the control circuit 100 is configured to control a constant-voltage closed loop for causing a voltage of a voltage feedback signal Vfb obtained based on an output voltage to approach a voltage of a reference voltage signal Vfb_ref obtained based on a base voltage Vref, thus making the output voltage constant. In addition, when a sampled current Io obtained from an output current is higher than a predetermined current Iref, or when an output power is higher than a predetermined power Pref, the control circuit 100 increases the voltage feedback signal Vfb or decreases the reference voltage signal Vfb_ref, in the constant-voltage closed loop, and reduces the output voltage and the output current by the constant-voltage closed loop, thereby limiting the output current and output power. Here, the "output power" is, for example, represented by an output power characterizing value (the product of an output voltage characterizing value Vout that characterizes the output voltage feedback and the sampled current Io). That is, power-limiting modulation is carried out when the output power characterizing value is higher than the predetermined power Pref. It would be appreciated that limiting the output power characterizing value will limit the output power from the output port of the power output circuit (the product of the output voltage and the output current).

In the control circuit 100, when the sampled current Io is not higher than the predetermined current Iref and the output power is not higher than the predetermined power Pref, the voltage feedback signal Vfb may be configured to be proportional to the output voltage characterizing value Vout, and the reference voltage signal Vfb_ref may be configured to be proportional to the base voltage Vref.

Optionally, the control circuit 100 compensates for the voltage feedback signal Vfb or the reference voltage signal Vfb_ref using an amplified error signal ErCC characterizing that the sampled current Io is higher than a reference current Io_ref (see FIG. 2), thus increasing the voltage feedback signal Vfb or decreasing the reference voltage signal Vfb_ref. The reference current Io_ref is generated based on the aforementioned predetermined power Pref, predetermined current Iref and output voltage characterizing value Vout. For instance, the reference current Io_ref is a lower one of i) quotient of the predetermined power Pref and the output voltage characterizing value Vout, and ii) the predetermined current Iref.

Optionally, the control circuit 100 compensates for the voltage feedback signal Vfb or the reference voltage signal Vfb_ref by using a first amplified error signal ErCC1 characterizing that the sampled current Io is higher than the reference current Io_ref (see FIG. 5), thus increasing the voltage feedback signal Vfb or decreasing the reference voltage signal Vfb_ref. Additionally, it compensates for the voltage feedback signal Vfb or the reference voltage signal Vfb_ref by using a second amplified error signal ErCC2 characterizing that the output power is higher than the predetermined power Pref (see FIG. 5), thus increasing the voltage feedback signal Vfb or decreasing the reference voltage signal Vfb_ref.

Referring to FIGS. 2 and 5, in order to form the constant-voltage closed loop capable of providing the limited output current and limited output power, the control circuit 100 include an error amplification module 10, an addition and subtraction module 20, a comparison module 30 and a control module 40.

The error amplification module 10 is configured to: compare the sampled current Io obtained based on the output current with the predetermined current Iref; compare the output power characterizing value that characterizes the output power with the predetermined power Pref; and output an amplified error signal indicative of current-limiting compensation information or power limiting compensation information.

The addition and subtraction module 20 is coupled to the error amplification module 10 and is configured to receive the base voltage Vref, the output voltage characterizing value Vout that characterizes the output voltage feedback and the amplified error signal output from the error amplification module 10, to generate the reference voltage signal Vfb_ref based on the base voltage Vref, to generate the voltage feedback signal Vfb based on the output voltage characterizing value Vout and, when the sampled current Io is higher than the predetermined current Iref, or when the output power characterizing value is higher than the predetermined power Pref, the voltage feedback signal Vfb is increased or the reference voltage signal Vfb_ref is decreased.

The comparison module 30 is configured to compare the voltage feedback signal Vfb and the reference voltage signal Vfb_ref and to produce an output feedback signal PoReq_S.

The control module 40 is configured to receive the output feedback signal PoReq_S and to produce a control signal for controlling the output voltage, which causes the voltage of the voltage feedback signal Vfb to approach the voltage of the reference voltage signal Vfb_ref.

In the above-described control circuit 100, the voltage feedback signal Vfb and the reference voltage signal Vfb_ref are configured for constant-voltage modulation, and the amplified error signal is configured to compensate for the output voltage feedback signal Vfb or the reference voltage signal Vfb_ref. The embodiments shown in FIGS. 2 and 5 are further explained below.

In the embodiment of FIG. 2, in order to address the requirements of output power limitation, the control circuit 100 further includes a reference current generation module 50 configured to receive the predetermined power Pref, the output voltage characterizing value Vout and the predetermined current Iref and to generate the reference current Io_ref. The reference current Io_ref is a lower one of i) quotient of the predetermined power Pref and the output voltage characterizing value Vout, and ii) the predetermined current Iref. The reference current generation module 50 can be implemented by either an analog circuit or a digital circuit.

Using the reference current generation module 50, when the output power characterizing value (the product of the output voltage characterizing value Vout and the sampled current Io) does not exceed the predetermined power Pref, power-limiting modulation is not conducted. In this case, the quotient of the predetermined power Pref and the output voltage characterizing value Vout is higher than or equal to the predetermined current Iref, and the reference current generation module 50 outputs the predetermined current Iref. That is, the reference current Io_ref is equal to the predetermined current Iref. Moreover, in this case, the error amplification module 10 compares the sampled current Io and the reference current Io_ref (i.e., predetermined the current Iref) and outputs the amplified error signal. Specifically, when the sampled current Io is lower than or equal to the predetermined current Iref, current-limiting modulation is not performed. Correspondingly, the amplified error signal ErCC does nothing to the voltage feedback signal Vfb and the reference voltage signal Vfb_ref output from the addition and subtraction module 20, and the control circuit 100 is in a constant-voltage mode. When the sampled current Io is higher than the predetermined current Iref, the amplified error signal ErCC compensates for the voltage feedback signal Vfb or the reference voltage signal Vfb_ref output from the addition and subtraction module 20, thus increasing the voltage feedback signal Vfb or decreasing the reference voltage signal Vfb_ref. Processed by the comparison module 30, the control module 40 and the main power circuit, the voltage of the voltage feedback signal Vfb is caused to approach the voltage of the reference voltage signal Vfb_ref. That is, the output voltage is pulled down as a result of constant-voltage control, leading to a reduction in the sampled current Io. The sampled current Io is then compared with the predetermined current Iref, and the amplified error signal ErCC is responsively output. In this way, a "current-limiting closed loop" is formed, which prevents the sampled current Io from exceeding the reference current Io_ref, achieving the current-limiting modulation.

Using the reference current generation module 50, when the output voltage and the output current increase, the output power characterizing value exceeds the predetermined power Pref, the power-limiting modulation can be carried out to lower the quotient of the predetermined power Pref and the output voltage characterizing value Vout to a value lower than the predetermined current Iref. As a result, the reference current Io_ref generated by the reference current generation module 50 is lower than the predetermined current Iref, and the sampled current Io is higher than the reference current Io_ref. Correspondingly, the amplified error signal ErCC compensates for the voltage feedback signal Vfb or the reference voltage signal Vfb_ref output from the addition and subtraction module 20, thus increasing the voltage feedback signal Vfb or decreasing the reference voltage signal Vfb_ref. Processed by the comparison module 30, the control module 40 and the main power circuit, the voltage of the voltage feedback signal Vfb is caused to approach the voltage of the reference voltage signal Vfb_ref. That is, the output voltage and the sampled current Io are decreased as a result of current-limiting modulation and constant-voltage control, wherein the sampled current Io is reduced to a value not exceeding the reference current Io_ref. In other words, the output voltage and the corresponding output current are decreased to result in an increase in the quotient of the predetermined power Pref and the output voltage characterizing value Vout. It is then compared the quotient of the predetermined power Pref and the output voltage characterizing value Vout with the predetermined current Iref, and the reference current Io_ref is updated. In this way, a "power-limiting closed-loop" is formed, which prevents the output power from exceeding the predetermined power Pref, achieving the power-limiting modulation.

Figure 3:
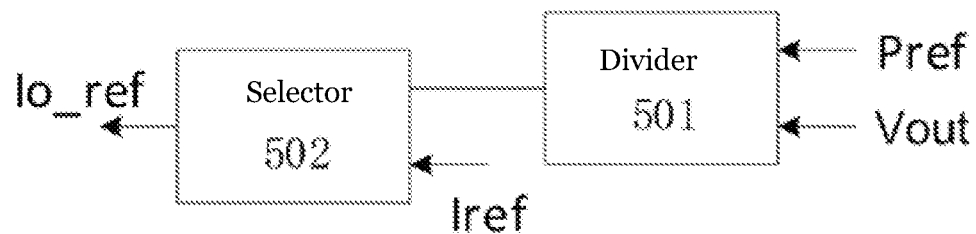
FIG. 3 is a schematic circuit diagram of a reference current generation module according to an embodiment of the present invention.

FIG. 3 is a schematic circuit diagram of the reference current generation module according to an embodiment of the present invention. Referring to FIG. 3, the reference current generation module 50 may include a divider 501 and a selector 502. The divider 501 receives the aforementioned predetermined power Pref and the output voltage characterizing value Vout and outputs the quotient of the predetermined power Pref and the output voltage characterizing value Vout. The selector 502 receives the aforementioned predetermined current Iref at a first input terminal thereof, and its second input terminal is coupled to an output terminal of the divider 501 in order to receive the quotient of the predetermined power Pref and the output voltage characterizing value Vout. The selector 502 selects the lower one of the signals input at the first and second input terminals as the reference current Io_ref and outputs it.

As can be seen from the above description, the control circuits 100 according to embodiments of the present invention can simultaneously choose to perform constant-voltage modulation and adjust the output current and the output power to values not exceeding the respective predefined maximum values. Therefore, it is functionally comprehensive and flexible. The base voltage Vref, the reference current Io_ref and the predetermined power Pref may be set as needed. The modulations of the output current and the output power may be selectively done as need. For example, if the control circuit 100 is required to provide only output current limitation but not output power limitation over a period during its operation, then the predetermined power Pref may be set to such a high value that the quotient of the predetermined power Pref and the output voltage characterizing value Vout is higher than the predetermined current Iref over the period and the reference current Io_ref is equal to the predetermined current Iref. As a result, the sampled current Io is caused to be not higher than the predetermined current Iref by current-limiting modulation. If the control circuit 100 is required to provide only output power limitation but not output current limitation over a period during its operation, then the predetermined current Iref may be set to such a high value that the reference current Io_ref is equal to the quotient of the predetermined power Pref and the output voltage characterizing value Vout over the period. As a result, the output power is caused to be not higher than the predetermined power Pref during the period by power-limiting modulation. If the control circuit 100 is required to provide both output power limitation and output current limitation over a period during its operation, the predetermined power Pref and the predetermined current Iref may be properly set (e.g., the predetermined current Iref is set to be equal to a value of the sampled current at which the output power characterizing value is equal to the predetermined power Pref) so that the current-limiting modulation or the power-limiting modulation is chosen depending on real-time output current and output power.

The error amplification module 10 of FIG. 2 may include an operational transconductance amplifier (OTA) or an operational error amplifier (EA) configured to receive the aforementioned sampled current Io and reference current Io_ref and responsively output the amplified error signal ErCC. Depending on the configuration of the particular implementation of the error amplification module, voltage signals obtained from the sampled current Io and the reference current Io_ref may be input to the error amplification module 10 for comparison.

Figure 4A:
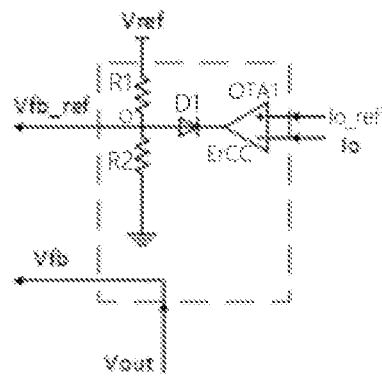
FIGS. 4A to 4D are schematic circuit diagrams of an error amplification module, and an addition and subtraction module in the control circuit according to embodiments of the present invention.
Figure 4B:
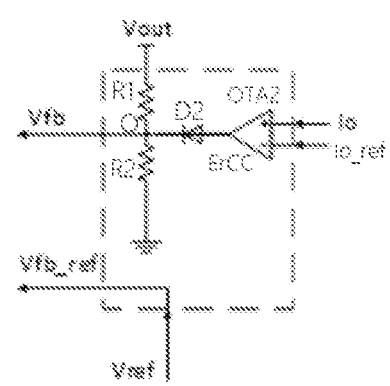

FIGS. 4A and 4B show two embodiments of the error amplification module 10 and the addition and subtraction module 20 in the control circuit 100 of FIG. 2. The error amplification module 10 includes an operational transconductance amplifier that outputs the amplified error signal ErCC, and the addition and subtraction module 20 includes two resistors (R1, R2) connected in series between the aforementioned base voltage Vref and a ground or between the aforementioned output voltage characterizing value Vout and the ground. The amplified error signal ErCC that characterizes that the sampled current Io is higher than the reference current Io_ref is transmitted via a diode to a series connection node of the two resistors to compensate for the voltage of a corresponding one of the reference voltage signal Vfb_ref and the voltage feedback signal Vfb output from the series connection node, with the voltage of the other one of the reference voltage signal Vfb_ref and the voltage feedback signal Vfb remaining unchanged.

Specifically, referring to FIG. 4A, in the optional embodiment, the error amplification module 10 includes an operational transconductance amplifier, denoted as OTA1. A voltage signal corresponding to the aforementioned reference current Io_ref (i.e., a voltage signal produced based on the reference current Io_ref) is received at a non-inverting input terminal ("+" terminal) of OTA1, and a voltage signal corresponding to the aforementioned sampled current Io (i.e., a voltage signal produced based on the sampled current Io) is received at an inverting input terminal ("−" terminal) of OTA1. The amplified error signal ErCC generated based on a comparison drawn between the sampled current Io and the reference current Io_ref by the error amplification module 10 is output from an output terminal of OTA1. The addition and subtraction module 20 includes the aforementioned resistors R1 and R2 connected in series between the base voltage Vref and ground (here, R2 is grounded, for example), and the reference voltage signal Vfb_ref generated based on the base voltage Vref is a voltage present at the series connection node O of R1 and R2. In this embodiment, the amplified error signal ErCC is configured to tune the reference voltage signal Vfb_ref, i.e., the voltage serving as a constant-voltage reference in the constant-voltage closed loop, while the voltage feedback signal Vfb providing as a voltage feedback value in the constant-voltage closed loop is not affected by the amplified error signal ErCC. The voltage of the voltage feedback signal Vfb is equal to the output voltage characterizing value Vout (i.e., Vfb=Vout). Moreover, in order to allow the amplified error signal ErCC to, when the sampled current Io is higher than the reference current Io_ref, act to decrease the voltage at the series connection node O of the first resistor R1 and the second resistor R2 (i.e., the reference voltage Vfb_ref) relative to a constant-voltage mode (in which Vfb_ref maintained constant as Vfb_ref=k1\*Vref, where k1 is a proportional factor); and to allow the amplified error signal ErCC to, when the sampled current Io is lower than or equal to the reference current Io_ref, do nothing to the voltage at the series connection node O (i.e., to accomplish current-limiting modulation). The amplified error signal ErCC is fed to the addition and subtraction module 20 through a diode D1. A cathode of D1 is coupled to the output terminal of OTA1, and an anode of D1 is coupled to the series connection node O of R1 and R2.

In the embodiment shown in FIG. 4A, the control circuit 100 accomplishes constant-voltage modulation and current-limiting modulation in the following manner. When the sampled current Io is lower than the reference current Io_ref (i.e., Io<Iref), an output current from OTA1 is directed from right to left. As blocked by D1, the output of OTA1 does nothing to the series connection node of R1 and R2. At this point, it is in a constant-voltage mode in which the reference voltage signal Vfb_ref is a fraction of the base voltage Vref, which is a constant value. After being processed by the constant-voltage closed loop, the voltage feedback signal Vfb is caused to approach the reference voltage signal Vfb_ref. Thus, Vout=Vfb=Vfb_ref=k1\*Vref, where k1 is a proportional factor. When the sampled current Io is higher than reference current Io_ref (i.e., Io>Iref), the output current from OTA1 is directed from left to right. The output of OTA1 acts on the series connection node O of R1 and R2, causing a decrease in the voltage of the reference voltage signal Vfb_ref with respect to k1\*Vref. After being processed by the constant-voltage closed loop, the control signal reduces the difference between the voltage feedback signal Vfb and the reference voltage signal Vfb_ref. That is, the output voltage characterizing value Vout is decreased, reducing the output voltage and hence the output current. As a result, the sampled current Io drops to a level very close to that of the reference current Io_ref (i.e., Io=Iref).

Referring to FIG. 4B, in the optional embodiment, the error amplification module 10 includes an operational transconductance amplifier, denoted as OTA2. A voltage signal corresponding to the aforementioned sampled current Io is received at a non-inverting input terminal of OTA2, and a voltage signal corresponding to the aforementioned reference current Io_ref is received at an inverting input terminal of OTA2. The amplified error signal ErCC generated based on a comparison drawn between the sampled current Io and the reference current Io_ref by the error amplification module 10 is output from an output terminal of OTA2 (as shown in the figure, the amplified error signal is actually an output current of OTA2). The addition and subtraction module 20 includes the resistors R1 and R2 connected in series between the aforementioned output voltage characterizing value Vout and ground (here, R2 is grounded, for example), and the voltage of the voltage feedback signal Vfb generated based on the output voltage characterizing value Vout is present at the series connection node O of R1 and R2. In this embodiment, the amplified error signal ErCC is configured to adjust the voltage feedback signal Vfb, i.e., the voltage of a voltage feedback provided in the constant-voltage closed loop, while the reference voltage signal Vfb_ref serving as a constant-voltage reference in the constant-voltage closed loop is not affected by the amplified error signal ErCC. The voltage of the reference voltage signal Vfb_ref is equal to the base voltage Vref (i.e., Vfb_ref=Vref). Moreover, in order to allow the amplified error signal ErCC to, when the sampled current Io is higher than reference current Io_ref, act to decrease the voltage at the series connection node O of R1 and R2 (i.e., the feedback voltage Vfb) with respect to a constant-voltage mode (in which Vout=k2*Vfb and Vfb=Vfb_ref=Vref, where k2 is a proportional factor) and to allow the amplified error signal ErCC to, when the sampled current Io is lower than or equal to the reference current Io_ref, do nothing to the voltage at the series connection node O (i.e., to accomplish current-limiting modulation). The amplified error signal ErCC is fed to the addition and subtraction module 20 through a diode D2. An anode of D2 is coupled to the output terminal of OTA2, and a cathode of D2 is coupled to the series connection node O of the first resistor R1 and the second resistor R2.

In the embodiment shown in FIG. 4B, the control circuit 100 accomplishes constant-voltage modulation and current-limiting modulation in the following manner. When the sampled current Io is lower than the reference current Io_ref (i.e., Io<Iref), the output current is directed from left to right. As blocked by D2, the output of OTA2 does nothing to the series connection node O of R1 and R2. At this point, it is in a constant-voltage mode, in which Vout=k2*Vfb=k2*Vfb_ref=k2*Vref, where k2 is a proportional factor. When the sampled current Io is higher than the reference current Io_ref (i.e., Io>Iref), the output current from OTA2 is directed from right to left and acts on the series connection node O of R1 and R2, increasing the voltage feedback signal Vfb with respect to the voltage for constant-voltage modulation. After being processed by the constant-voltage closed loop, the control signal reduces the difference between the voltage feedback signal Vfb and the reference voltage signal Vfb_ref. That is, the output voltage characterizing value Vout is decreased, reducing the output voltage and hence the output current. As a result, the sampled current Io drops to a level very close to that of the reference current Io_ref (i.e., Io=Iref).

Figure 4C:
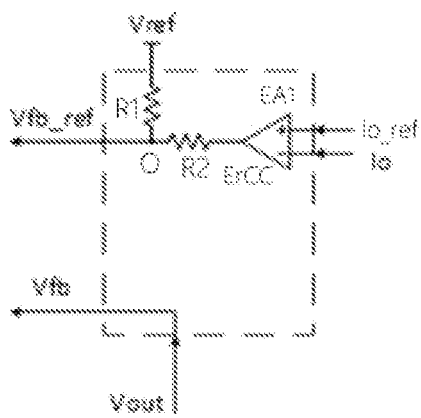
Figure 4D:
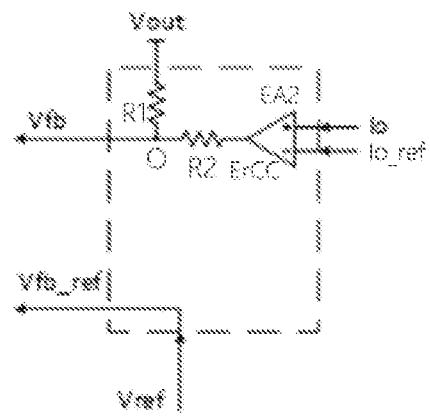

FIGS. 4C and 4D show other two embodiments of the error amplification module 10 and the addition and subtraction module 20 in the control circuit 100 of FIG. 2. Wherein, the error amplification module 10 includes an operational error amplifier that outputs the amplified error signal ErCC, and the addition and subtraction module 20 includes a first resistor R1. One end of the first resistor is coupled to the aforementioned base voltage Vref or output voltage characterizing value Vout, and the other end is connected in series with a second resistor R2. The amplified error signal ErCC characterizing that the sampled current Io is higher than the reference current Io_ref is transmitted via the second resistor to a series connection node of the first resistor R1 and the second resistor R2 to compensate for the voltage of a corresponding one of the reference voltage signal Vfb_ref and the voltage feedback signal Vfb output from the series connection node, with the voltage of the other one of the reference voltage signal Vfb_ref and the voltage feedback signal Vfb remaining unchanged.

Specifically, referring to FIG. 4C, in the optional embodiment, the error amplification module 10 includes an operational error amplifier powered by a negative voltage, denoted as EA1. A voltage signal corresponding to the aforementioned reference current Io_ref is received at a non-inverting input terminal ("+" terminal) of EA1, and a voltage signal corresponding to the sampled current Io is received at an inverting input terminal ("−" terminal) of EA1. The amplified error signal ErCC generated based on a comparison drawn between the sampled current Io and the reference current Io_ref by the error amplification module 10 is output from an output terminal of EA1. The addition and subtraction module 20 includes a first resistor R1. One end of the first resistor R1 is coupled to the aforementioned base voltage Vref, and the other end is connected in series with a second resistor R2. The reference voltage signal Vfb_ref generated based on the base voltage Vref is coupled to a series connection node O of the first resistor R1 and the second resistor R2. In this embodiment, the amplified error signal ErCC output from the output terminal of EA1 is transmitted via the second resistor R2 to the series connection node on the first resistor R1 to tune the reference voltage signal Vfb_ref, i.e., the voltage serving as a constant-voltage reference in the constant-voltage closed loop. Meanwhile, the voltage feedback signal Vfb in the constant-voltage closed loop is not affected by the amplified error signal ErCC. The voltage feedback signal Vfb is coupled to the output voltage characterizing value Vout.

In the embodiment of FIG. 4C, the control circuit 100 accomplishes constant-voltage modulation and current-limiting modulation in the following manner. When the sampled current Io is lower than the reference current Io_ref (i.e., Io<Iref), the output of EA1, i.e., the amplified error signal ErCC, is zero and has no impact on the series connection node O of R1 and R2. At this point, it is in a constant-voltage mode in which the reference voltage signal Vfb_ref is a fraction of the base voltage Vref, which is a constant value. After being processed by the constant-voltage closed-loop, the voltage feedback signal Vfb is caused to approach the reference voltage signal Vfb_ref, i.e., Vout=Vfb=Vfb_ref=k1*Vref, where k1 is a proportional factor. When the sampled current Io is higher than the reference current Io_ref (i.e., Io>Iref), the output of EA1, i.e., the amplified error signal ErCC, is negative and acts on the series connection node O of R1 and R2, decreasing the voltage of the reference voltage signal Vfb_ref with respect to k1*Vref. Processed by the constant-voltage closed-loop, the control signal reduces the difference between the voltage feedback signal Vfb and the reference voltage signal Vfb_ref. That is, it reduces the output voltage characterizing value Vout and hence both the output voltage and the output current. As a result, the sampled current Io drops to a level very close to that of the reference current Io_ref (i.e., Io=Iref).

Referring to FIG. 4D, in the optional embodiment, the error amplification module 10 includes an operational error amplifier powered by a positive voltage, denoted as EA2. A voltage signal corresponding to the aforementioned sampled current Io is received at a non-inverting input terminal of EA2, and a voltage signal corresponding to the aforementioned reference current Io_ref is received at an inverting input terminal of EA2. The amplified error signal ErCC generated based on a comparison drawn between the sampled current Io and the reference current Io_ref by the error amplification module 10 is output from an output terminal of EA2. The addition and subtraction module 20 includes a first resistor R1. One end of the first resistor R1 is coupled to the aforementioned output voltage characterizing value Vout, and the other end is connected in series with a second resistor R2. The voltage feedback signal Vfb generated based on the output voltage feedback is coupled to a series connection node O of the first resistor R1 and the second resistor R2. That is, it is a voltage present at the series connection node O. In this embodiment, the amplified error signal ErCC output from the output terminal of EA2 is transmitted via the second resistor R2 to the series connection node on the first resistor R1 to tune the voltage feedback signal Vfb, i.e., the voltage of a voltage feedback in the constant-voltage closed loop. Meanwhile, the reference voltage signal Vfb_ref serving as a constant-voltage reference in the constant-voltage closed loop is not affected by the amplified error signal ErCC. The voltage of the reference voltage signal Vfb_ref is equal to the base voltage Vref (i.e., Vfb_ref=Vref). The base voltage Vref is a predetermined constant value.

In the embodiment of FIG. 4D, the control circuit 100 accomplishes constant-voltage modulation and current-limiting modulation in the following manner. When the sampled current Io is lower than the reference current Io_ref (i.e., Io<Iref), the output of EA2, i.e., the amplified error signal ErCC, is zero and has no impact on the series connection node O of R1 and R2. At this point, it is in a constant-voltage mode in which Vout=k2*Vfb=k2*Vfb_ref=k2*Vref, where k2 is a proportional factor. When the sampled current Io is higher than the reference current Io_ref (i.e., Io>Iref), the output of EA2, i.e., the amplified error signal ErCC, is positive and acts on the series connection node O of R1 and R2 to increase the voltage feedback signal Vfb with respect to the voltage for constant-voltage modulation. Processed by the constant-voltage closed-loop, the control signal reduces the difference between the voltage feedback signal Vfb and the reference voltage signal Vfb_ref. That is, it reduces the output voltage characterizing value Vout and hence both the output voltage and the output current. As a result, the sampled current Io drops to a level very close to that of the reference current Io_ref (i.e., Io=Iref). Constant-voltage modulation and current-limiting modulation can be achieved by the error amplification module 10 and the addition and subtraction module 20 shown in FIGS. 4A to 4D. Moreover, power-limiting modulation can be additional achieved when used in combination with the above-described reference current generation module 50.

Compared with the embodiment of FIG. 2, in the embodiment shown in FIG. 5, the error amplification module 10 additionally includes a first error amplification unit 101 and a second error amplification unit 102. The first error amplification unit 101 is configured to compare the aforementioned sampled current Io with the predetermined current Iref and to output a first amplified error signal ErCC1. The second error amplification unit 102 is configured to compare the aforementioned output power characterizing value with the predetermined power Pref and to output a second amplified error signal ErCC2. Therefore, amplified error signals output from the error amplification module 10 and received by the addition and subtraction module 20 include the first amplified error signal ErCC1 and the second amplified error signal ErCC2. In the embodiment shown in FIG. 5, the reference current generation module 50 of FIG. 2 is omitted. That is, in this embodiment, the sampled current Io is directly compared with the predetermined current Iref, without being affected by the output power.

Referring to FIG. 5, the first amplified error signal ErCC1 and the second amplified error signal ErCC2 are output to the addition and subtraction module 20. When the sampled current Io exceeds the predetermined current Iref, or when the product of the output voltage characterizing value Vout and the sampled current Io, i.e., the output power characterizing value, exceeds the predetermined power Pref, the first amplified error signal ErCC1 and the second amplified error signal ErCC2 are utilized to compensate for the output voltage feedback signal Vfb or reference voltage signal Vfb_ref output from the addition and subtraction module 20. The voltage feedback signal Vfb and the reference voltage signal Vfb_ref are additionally configured for constant-voltage modulation. The compensation increases the voltage feedback signal Vfb or decreases the reference voltage signal Vfb_ref in the constant-voltage closed loop from the value prior to current limitation or power limitation. As a result, the output voltage is increased, thus decreasing the sampled current Io to a level not higher than the predetermined current Iref, or decreasing the output power characterizing value to a value not higher than the predetermined power Pref, as desired.

Figures 6A, 6B:
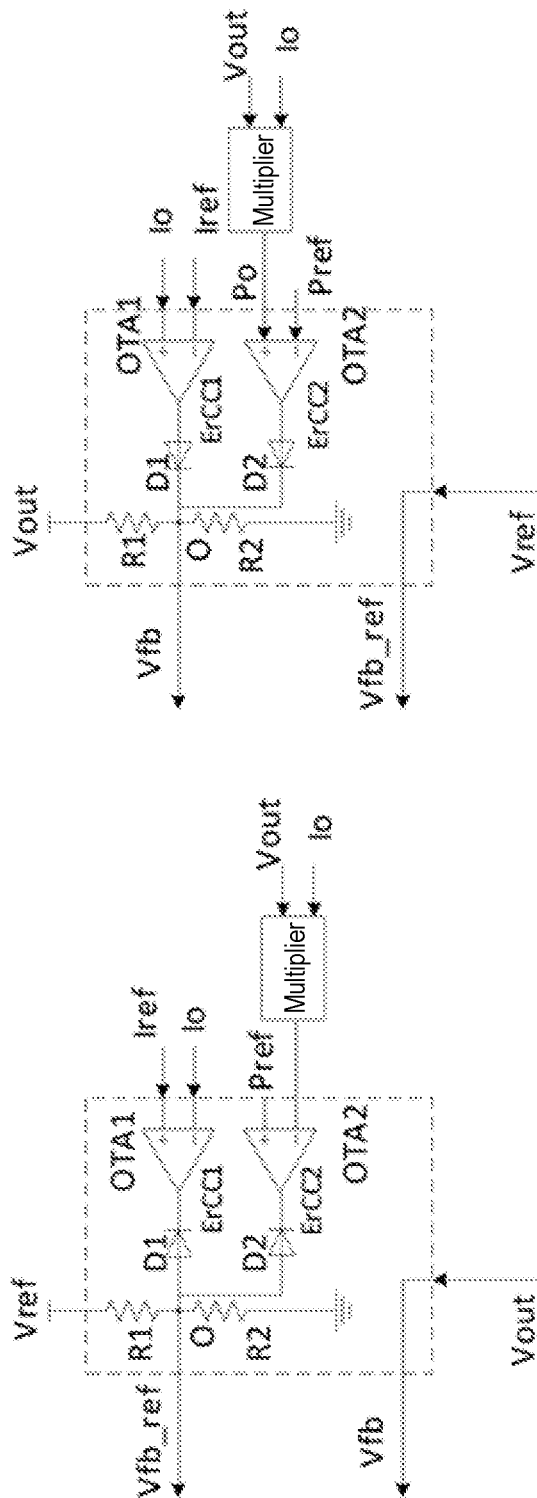
FIGS. 6A to 6D are schematic circuit diagrams of the error amplification module, and the addition and subtraction module in the control circuit according to embodiments of the present invention.

FIGS. 6A and 6B show two embodiments of the error amplification module 10 and the addition and subtraction module 20 in the control circuit 100 shown in FIG. 5. Referring to FIGS. 6A and 6B, the first error amplification unit 101 includes a first operational transconductance amplifier OTA1 that outputs the first amplified error signal ErCC1, and the second error amplification unit 102 includes a second operational transconductance amplifier OTA2 that outputs the second amplified error signal ErCC2. The addition and subtraction module 20 includes the two resistors R1 and R2 that are connected in series between the aforementioned base voltage Vref and the ground or between the aforementioned output voltage characterizing value Vout and the ground. The first amplified error signal ErCC1 characterizing that the sampled current Io is higher than the predetermined current Iref is transmitted via a first diode (D1) to the series connection node of the two resistors. The second amplified error signal ErCC2 characterizing that the output power characterizing value is higher than the predetermined power Pref is transmitted via a second diode (D2) to the series connection node of the two resistors. Thus, the voltage of a corresponding one of the reference voltage signal Vfb_ref and the voltage feedback signal Vfb output from the series connection node is compensated for, while the voltage of the other one of the reference voltage signal Vfb_ref and the voltage feedback signal Vfb remains unchanged. The second error amplification unit 102 may further include a multiplier which receives the output voltage characterizing value Vout and the sampled current Io and outputs the product of them as the output power characterizing value. An input terminal of the second operational transconductance amplifier OTA2 is coupled to an output terminal of the multiplier in order to receive the output power characterizing value.

Specifically, referring to FIGS. 6A and 6B, OTA1 generates the first amplified error signal ErCC1 based on both the sampled current Io and the predetermined current Iref, and the sampled current Io and the output voltage characterizing value Vout are input to the multiplier which then calculates the product Po of the sampled current Io and the output voltage characterizing value Vout, wherein the Po represents the output power characterizing value. OTA2 generates the second amplified error signal ErCC2 based on Po and the predetermined power Pref. The first amplified error signal ErCC1 and the second amplified error signal ErCC2 are fed to the addition and subtraction module 20 respectively via the diodes D1 and D2. Specifically, the first amplified error signal ErCC1 is coupled via D1 to the series connection node O of the two resistors in the addition and subtraction module 20, and the second amplified error signal ErCC2 is coupled via diode D2 also to the series connection node O. FIGS. 6A and 6B differ from each other in that one of them compensates for the reference voltage signal Vfb_ref serving as a voltage reference in the constant-voltage closed loop and the other compensates for the voltage feedback signal Vfb serving as a feedback voltage in the constant-voltage closed loop. FIGS. 6A and 6B also differ in terms of how signals are input to the transconductance amplifiers and in the conduction directions of the diodes D1 and D2. The first amplified error signal ErCC1 in FIGS. 6A and 6B is generated and fed to the addition and subtraction module 20 in the same manners as the amplified error signal ErCC in FIGS. 4A and 4B. For power-limiting modulation, the reference current generation module 50 is connected to enable reference current adjustment in FIGS. 4A and 4B. However, the reference current generation module 50 is omitted in FIGS. 6A and 6B. Instead, the output of the second error amplification unit 102 is utilized to directly compensate for the reference voltage signal Vfb_ref or the voltage feedback signal Vfb. Reference can be made to FIGS. 4A and 4B for a better understanding of how the circuits shown in FIGS. 6A and 6B operate to achieve constant-voltage modulation, current-limiting modulation and power-limiting modulation.

Figures 6C, 6D:
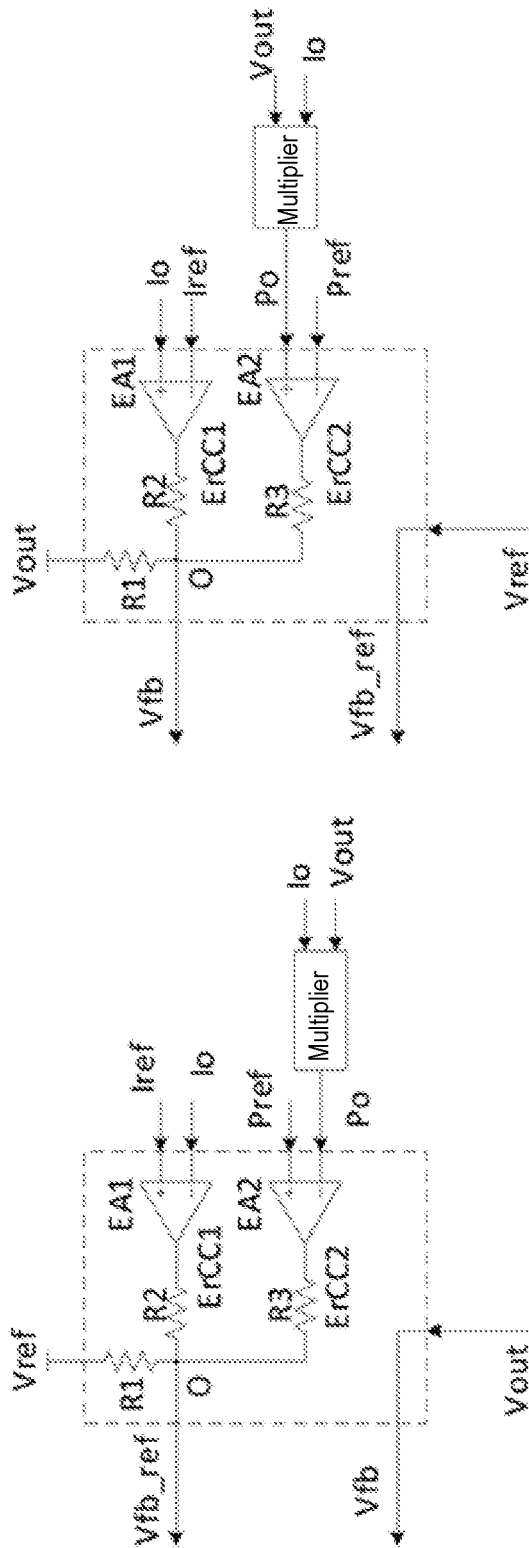

FIGS. 6C and 6D show other two embodiments of the error amplification module 10 and the addition and subtraction module 20 in the control circuit 100 of FIG. 5. Referring to FIGS. 6C and 6D, the first error amplification unit 101 includes a first operational error amplifier EA1 that outputs the first amplified error signal ErCC1 and the second error amplification unit 102 includes a second operational error amplifier (EA2) that outputs the second amplified error signal ErCC2. The addition and subtraction module 20 includes a first resistor R1. One end of the first resistor is coupled to the aforementioned base voltage Vref or output voltage characterizing value Vout, and the other end is connected in series with a second resistor R2. The first amplified error signal ErCC1 characterizing that the sampled current Io is higher than the predetermined current Iref is fed via the second resistor to the series connection node of the first resistor and the second resistor. The second amplified error signal ErCC2 characterizing that the output power characterizing value is higher than the predetermined power Pref is fed via the third resistor to the series connection node of the first resistor and the second resistor. Thus, the voltage of a corresponding one of the reference voltage signal Vfb_ref and the voltage feedback signal Vfb output from the series connection node is compensated for, while the voltage of the other one of the reference voltage signal Vfb_ref and the voltage feedback signal Vfb remains unchanged. The second error amplification unit 102 may further include a multiplier which receives the output voltage characterizing value Vout and the sampled current Io and outputs the product of them as the output power characterizing value.

In both the embodiments shown in FIGS. 6C and 6D, two operational error amplifiers are included. Specifically, EA1 generates the first amplified error signal ErCC1 based on the sampled current Io and the predetermined current Iref, and the sampled current Io and the output voltage characterizing value Vout are input to the multiplier which then calculates the product Po of the sampled current Io and the output voltage characterizing value Vout as the output power characterizing value. EA2 generates the second amplified error signal ErCC2 based on the Po and the predetermined power Pref. ErCC1 and ErCC2 are fed to the same node (i.e., the series connection node O of R1 and R2) in the addition and subtraction module 20 respectively via the resistors R2 and R3. Reference can be made to the above description in connection with FIGS. 6A and 6B for a better understanding of how FIGS. 6C and 6D differ from each other.

In the embodiments shown in FIGS. 2 and 5, the comparison module 30 is configured to compare the aforementioned feedback voltage Vfb and reference voltage Vfb_ref and to generate the output feedback signal PoReq_S. FIG. 7 is a schematic circuit diagram of the comparison module in the control circuit according to an embodiment of the present invention. Referring to FIG. 7, the comparison module 30 may include an operational error amplifier (EA). The aforementioned voltage feedback signal Vfb and reference voltage signal Vfb_ref are respectively input to two input ports of the operational error amplifier and processed in the operational error amplifier, resulting in the formation of the output feedback signal PoReq_S which is then output from an output terminal of the operational error amplifier. For example, in one embodiment, when the reference voltage signal Vfb_ref is higher than the voltage feedback signal Vfb (i.e., Vfb_ref>Vfb), the feedback signal PoReq_S resulting from the processing in the operational error amplifier has a high level. Otherwise, it has a low level. In alternative embodiments, the comparison module 30 may be implemented by a comparator.

The control module 40 is configured to generate, based on the output feedback signal PoReq_S, the control signal for controlling the output voltage, thus creating the aforementioned constant-voltage closed loop. In this embodiment, the power output circuit controlled by the control circuit is, for example, a switched-mode power supply. The switched-mode power supply may include a power transistor (or power switch) for controlling the output voltage. The control signal output from the control module 40 may be configured to directly or indirectly turn on or off the power transistor, thus achieving adjustments in the output voltage and the associated output current.

FIG. 8A is a schematic circuit diagram of the control module in the control circuit according to an embodiment of the present invention. Referring to FIG. 8A, in this embodiment, the control module 40 employs constant on-time (COT) control to generate the control signal for controlling output voltage and output current. The control module 40 includes a flip-flop. A reset terminal R of the flip-flop is coupled to a timer for timing an on-time of the output voltage under the control of the control signal. The output feedback signal PoReq_S generated by the comparison module 30 is input to a set terminal S of the control module 40, and the control signal required by the constant-voltage closed loop according to embodiments of the present invention is generated at an output terminal of the flip-flop by taking into account an signal change at the reset terminal R.

FIG. 8B is a schematic circuit diagram of the control module in the control circuit according to an embodiment of the present invention. Referring to FIG. 8B, in this embodiment, the control module 40 employs pulse width modulation (PWM) to generate the control signal. The control module 40 includes an oscillator and a flip-flop. The feedback signal PoReq_S generated by the comparison module 30 is input to the oscillator, and an output of the oscillator is coupled to a set terminal S of the flip-flop. As an example, it is configured that when the output feedback signal PoReq_S is at a high level, the oscillator produces a periodic pulse signal clk and input it to the set terminal S, and that when the output feedback signal PoReq_S is at a low level, the oscillator does not produce a periodic pulse signal. The control module 40 further includes a comparison unit (e.g., EA3 in FIG. 8B). A non-inverting input terminal of the comparison unit is configured to receive the sampled current Ics that has passed through the power switch, and an inverting input terminal is configured to receive a peak current Ilimit that has passed through the power transistor. An output terminal of the comparison unit is coupled to a reset terminal R of the flip-flop, and the control signal required by the constant-voltage closed loop according to embodiments of the present invention is produced and output from the RS flip-flop by taking into account signals at the set terminal S and the reset terminal R.

In the present invention, the feedback signal (e.g., the aforementioned amplified error signal ErCC) produced from a comparison drawn between the predetermined current Iref and the sampled current Io is not directly transmitted to the control module 40 for the generation of the control signal for tuning the output voltage. Instead, tuning of the output voltage, the output current and the output power is accomplished by adjusting a reference in the constant-voltage closed loop (which is the reference voltage signal Vfb_ref in this embodiment) or a feedback in the constant-voltage closed-loop (which is the voltage feedback signal Vfb in this embodiment). Since an output capacitor comprising an equivalent series resistance (ESR) is typically disposed at the output voltage node, the output voltage feedback signal will comprise a sufficient AC component. Thus, the problem of control signal instability in a ripple-based control mode that relies on switching frequency ripple in the output current, which may arise in the case of an output current parameter being directly used for current-limiting modulation, can be avoided. With the current-limiting modulation approach according to this embodiment, an additional module with ripple injection capabilities is dispensed with, circumventing the influence of ripple injection on the accuracy.

In different circuit implementations, the error amplification module 10, the addition and subtraction module 20, the comparison module 30, the control module 40, the reference current generation module 50, the first error amplification unit 101 and the second error amplification unit 102 in the control circuit of the present invention may have different structures. It would be appreciated that, without departing from the technical principles of the present invention, all these different circuit implementations are also considered to fall within the scope of protection of the invention.

Embodiments of the present invention also relate to a control chip to control output voltage, output current and output power of a switched-mode power supply. The control chip incorporates the above-discussed control circuit. The switched-mode power supply may employ one of an isolated flyback topology, a non-isolated buck topology, a non-isolated boost-buck topology, a non-isolated boost topology and other circuit structures. The switched-mode power supply, for example, includes a power transistor which may be a switching element such as a MOS transistor, a triode, a JFET, an IGBT or the like.

Embodiments of the present invention also relate to a power supply device incorporating the above-discussed control circuit. The power supply device is an electric charger, for example.

Since the control chip and power supply device of the present invention both incorporate the above-described control circuit, they can also provide the constant-voltage modulation, the current-limiting modulation and the power-limiting modulation. The above-described control circuit can simultaneously choose to perform constant-voltage modulation and tune the output current and the output power to levels not exceeding the respective predefined maximum values. Therefore, it is functionally comprehensive and flexible. Additionally, the problem of control signal instability in a ripple-based control mode that relies on switching frequency ripple in the output current, which may arise in the case of an output current parameter being directly used for current-limiting modulation, can be avoided. Thus, improved control stability and control accuracy can be achieved.

The description presented above is merely of some preferred embodiments of the present invention and is not intended to limit the scope thereof in any sense. In light of the teachings hereinabove, any person of skill in the art may make various possible variations and changes to the disclosed embodiments without departing from the scope of the invention. Accordingly, any and all such simple variations, equivalent alternatives and modifications made to the foregoing embodiments without departing from the scope of the invention are intended to fall within the scope thereof.

What is claimed is:

1. A control circuit for controlling a constant-voltage closed loop, wherein the constant-voltage closed loop is configured to cause a voltage of a voltage feedback signal obtained from an output voltage to approach a voltage of a reference voltage signal obtained from a base voltage to achieve a constant-voltage output, wherein when a sampled current obtained from an output current is higher than a predetermined current, or when an output power is higher than a predetermined power, the control circuit increases the voltage feedback signal or decreases the reference voltage signal, causing the constant-voltage closed loop to decrease the output voltage and the output current and thereby achieving a limited output current and a limited output power, wherein when the sampled current is not higher than the predetermined current and the output power is not higher than the predetermined power, the voltage feedback signal is proportional to an output voltage characterizing value that characterizes an output voltage feedback, and wherein the reference voltage signal is proportional to the base voltage, wherein the control circuit compensates for the voltage feedback signal or the reference voltage signal using an amplified error signal characterizing that the sampled current is higher than a reference current, thereby increasing the voltage feedback signal or decreasing the reference voltage signal, and wherein the reference current is generated based on the predetermined power, the predetermined current and the output voltage characterizing value, and wherein the reference current is a lower one of i) a quotient of the predetermined power and the output voltage characterizing value, and ii) the predetermined current.

2. The control circuit of claim 1, wherein the control circuit compensates for the voltage feedback signal or the reference voltage signal using a first amplified error signal characterizing that the sampled current is higher than a reference current, thereby increasing the voltage feedback signal or decreasing the reference voltage signal, and simultaneously compensates for the voltage feedback signal or the reference voltage signal using a second amplified error signal characterizing that the output power is higher than the predetermined power, thereby increasing the voltage feedback signal or decreasing the reference voltage signal.

3. A control circuit, comprising:
an error amplification module configured to: compare a sampled current obtained from an output current with a predetermined current; compare an output power characterizing value that characterizes an output power with a predetermined power; and output an amplified error signal indicating a current-limiting or a power-limiting compensation information;
an addition and subtraction module configured to receive a base voltage, an output voltage characterizing value that characterizes an output voltage feedback and the amplified error signal, wherein a reference voltage signal is generated based on the base voltage, a voltage feedback signal is generated based on the output voltage characterizing value, and wherein when the sampled current is higher than the predetermined current, or when the output power characterizing value is higher than the predetermined power, the addition and subtraction module is configured to increase the voltage feedback signal or to decrease the reference voltage signal;
a comparison module configured to compare the voltage feedback signal with the reference voltage signal and to generate an output feedback signal;
a control module configured to receive the output feedback signal and to generate a control signal for controlling the output voltage so as to cause a voltage of the voltage feedback signal to approach a voltage of the reference voltage signal; and
a reference current generation module coupled to the error amplification module, wherein the reference current generation module is configured to generate a reference current based on the predetermined power, the output voltage characterizing value and the predetermined current, wherein the reference current is a lower one of i) a quotient of the predetermined power and the output voltage characterizing value and ii) the predetermined current.

4. The control circuit of claim 3, wherein the output power characterizing value is a product of the output voltage characterizing value and the sampled current.

5. The control circuit of claim 3, wherein the reference current generation module comprises:
a divider configured to receive the predetermined power and the output voltage characterizing value and to output the quotient of the predetermined power and the output voltage characterizing value; and
a selector having a first input terminal at which the predetermined current is received, and a second input terminal coupled to an output terminal of the divider, wherein the selector selects and outputs a lower one of a signal input to the first input terminal and a signal input to the second input terminal as the reference current.

6. The control circuit of claim 3, wherein the error amplification module comprises an operational transconductance amplifier configured to receive the reference current and the sampled current and to output the amplified error signal, and
wherein the addition and subtraction module comprises two resistors connected in series between the base voltage and a ground, or between the output voltage characterizing value and the ground, and wherein the amplified error signal characterizing that the sampled current is higher than the reference current is transmitted via a diode to a series connection node of the two resistors, thereby compensating for a voltage of a corresponding one of the reference voltage signal and the voltage feedback signal output from the series connection node, with a voltage of the other one of the reference voltage signal and the voltage feedback signal remaining unchanged.

7. The control circuit of claim 3, wherein the error amplification module comprises an operational error amplifier configured to receive the reference current and the sampled current and to output the amplified error signal, and
wherein the addition and subtraction module comprises a first resistor which is coupled at a first end to the base voltage or the output voltage characterizing value and is connected at a second end in series with a second resistor, and wherein the amplified error signal characterizing that the sampled current is higher than the reference current is transmitted via the second resistor to a series connection node of the first and second resistors, thereby compensating for a voltage of a corresponding one of the reference voltage signal and the voltage feedback signal output from the series connection node, with a voltage of the other one of the reference voltage signal and the voltage feedback signal remaining unchanged.

8. A control circuit, comprising:
an error amplification module configured to: compare a sampled current obtained from an output current with a predetermined current; compare an output power characterizing value that characterizes an output power with a predetermined power; and output an amplified error signal indicating a current-limiting or a power-limiting compensation information;
an addition and subtraction module configured to receive a base voltage, an output voltage characterizing value that characterizes an output voltage feedback and the amplified error signal, wherein a reference voltage signal is generated based on the base voltage, a voltage feedback signal is generated based on the output voltage characterizing value, and wherein when the sampled current is higher than the predetermined current, or when the output power characterizing value is higher than the predetermined power, the addition and subtraction module is configured to increase the voltage feedback signal or to decrease the reference voltage signal;
a comparison module configured to compare the voltage feedback signal with the reference voltage signal and to generate an output feedback signal; and
a control module configured to receive the output feedback signal and to generate a control signal for controlling the output voltage so as to cause a voltage of the voltage feedback signal to approach a voltage of the reference voltage signal,
wherein the amplified error signal comprises a first amplified error signal and a second amplified error signal, wherein the error amplification module comprises: a first error amplification unit configured to compare the sampled current with the predetermined current and to output the first amplified error signal; and a second error amplification unit configured to compare the output power characterizing value with the predetermined power and to output the second amplified error signal, and
wherein the first error amplification unit comprises a first operational transconductance amplifier that outputs the first amplified error signal, wherein the second error amplification unit comprises a second operational transconductance amplifier that outputs the second amplified error signal, wherein the addition and subtraction module comprises two resistors connected in series between the base voltage and a ground, wherein the first amplified error signal characterizing that the sampled current is higher than the predetermined current is transmitted via a first diode to a series connection node of the two resistors, and wherein the second amplified error signal characterizing that the output power characterizing value is higher than the predetermined power is transmitted via a second diode to the series connection node of the two resistors, thereby compensating for a voltage of the reference voltage signal output from the series connection node, with a voltage of the voltage feedback signal remaining unchanged.

9. The control circuit of claim 8, wherein the first error amplification unit comprises a first operational error amplifier that outputs the first amplified error signal, and wherein the second error amplification unit comprises a second operational error amplifier that outputs the second amplified error signal, and wherein the addition and subtraction module comprises a first resistor which is coupled at a first end to the base voltage or the output voltage characterizing value, and is connected at a second end with a second resistor, wherein the first amplified error signal characterizing that the sampled current is higher than the predetermined current is transmitted via the second resistor to a series connection node of the first and second resistors, and wherein the second amplified error signal characterizing that the output power characterizing value is higher than the predetermined power is transmitted via the second resistor to the series connection node of the first and second resistors, thereby compensating for a voltage of a corresponding one of the reference voltage signal and the voltage feedback signal output from the series connection node, with a voltage of the other one of the reference voltage signal and the voltage feedback signal remaining unchanged.

10. The control circuit of claim 9, wherein the second error amplification unit further comprises:

a multiplier configured to receive the output voltage characterizing value and the sampled current and to output a product of the output voltage characterizing value and the sampled current as the output power characterizing value.

11. The control circuit of claim 8, wherein the second error amplification unit further comprises:

a multiplier configured to receive the output voltage characterizing value and the sampled current and to output a product of the output voltage characterizing value and the sampled current as the output power characterizing value.

12. The control circuit of claim 8, wherein the first error amplification unit comprises a first operational transconductance amplifier that outputs the first amplified error signal, and wherein the second error amplification unit comprises a second operational transconductance amplifier that outputs the second amplified error signal, and wherein the addition and subtraction module comprises two resistors connected in series between the output voltage characterizing value and a ground, wherein the first amplified error signal characterizing that the sampled current is higher than the predetermined current is transmitted via a first diode to a series connection node of the two resistors, and wherein the second amplified error signal characterizing that the output power characterizing value is higher than the predetermined power is transmitted via a second diode to the series connection node of the two resistors, thereby compensating for a voltage of the voltage feedback signal output from the series connection node, with a voltage of the reference voltage signal remaining unchanged.

13. The control circuit of claim 12, wherein the second error amplification unit further comprises:

a multiplier configured to receive the output voltage characterizing value and the sampled current and to output a product of the output voltage characterizing value and the sampled current as the output power characterizing value.

* * * * *